United States Patent Office 3,655,649
Patented Apr. 11, 1972

3,655,649
PROCESS FOR THE PREPARATION OF 19-NORSTEROIDS
Gerhard Habermehl, Seligenstadt, and Arthur Haaf, Ober-Ramstadt, Germany, assignors to Merck Patent Gesellschaft mit beschrankter Haftung, Darmstadt, Germany
No Drawing. Filed Oct. 22, 1969, Ser. No. 868,570
Claims priority, application Germany, Oct. 25, 1968,
P 18 05 236.3
Int. Cl. C07c *169/10, 169/34*
U.S. Cl. 260—239.5
14 Claims

ABSTRACT OF THE DISCLOSURE

Pharmacologically and chemically useful 19-nor-3-keto-$\Delta^4$-steroids, e.g. norethisterone, are prepared by reacting a 19-hydroxy-3-keto-$\Delta^4$-steroid with a secondary amine to form the corresponding 19-nor-3,5-diene-3-amine. The latter is then hydrolyzed in a conventional manner with optionally additional steroid reactions being conducted subsequently or simultaneously.

BACKGROUND OF THE INVENTION

This invention relates to a novel and improved process for the preparation of 19-norsteroids as well as to novel intermediates therefor.

In general, 19-norsteroids are either pharmacologically active or can be converted by standard type reactions into active compounds. There is a wide variety of specific uses for such compounds, as seen by the chemical, medical, and patent literature on the subject, for example, Fieser and Fieser, Steroids, 1959, Reinhold. Several members of the class 17α-ethynyl-19-nor-testosterone (norethisterone); 17α-ethyl-19-nortestosterone (norethandrolone); 16-methylene-17α-acetoxy-19-nor-progesterone are well known highly active, progestational or anabolic agents. On the other hand, depending on the specific compound produced, other effects also occur: pregnancy-maintaining, antiestrogenic, ovulation-suppressing, androgenic and antiandrogenic activities. Accordingly, a process to produce this class of compounds will find wide utility in the steroid arts.

Various methods have been described in the literature for the preparation of these 19-norsteroids. For example, they can be obtained from corresponding 19-hydroxy-steroids by oxidizing the latter to 19-oxosteroids or to the corresponding carboxylic acids, and cleaving same by thermal, acid-catalytic or photochemical methods. It is also feasible to conduct the elimination of the 10-hydroxymethyl group as a base-catalyzed retroaldol condensation of vinylogous ketols but because of the poor yields, this process is not of industrial interest.

SUMMARY OF THE INVENTION

A principal object of the invention is to provide an improved process for the preparation of 19-norsteroids.

Another object of the invention is to provide one or more novel steroids.

To obtain the above objects, it has been discovered that, when reacting 19-hydroxy-3-keto-$\Delta^4$-steroids with secondary amines in inert solvents, the reaction product is not the expected enamine (3,5-diene-3-amine), but rather, with formaldehyde being split off, the enamine of the corresponding 19-nor-3-keto-$\Delta^4$-steroid (19 - nor-3,5-diene-3-amine). The 19-nor-3-keto-$\Delta^4$-steroid can then be obtained from the enamine by hydrolysis in a conventional manner.

Further chemical reactions can be conducted with the resultant enamine, if desired, before splitting the enamine group by hydrolysis. Especially suitable are those reactions having no effect on the enamine group, for example those wherein any further keto groups in the enamine molecule are reacted. It is then possible to reduce any 16- or 17-keto groups present, or to react such groups with organometallic reactants to form the corresponding carbinols. In this procedure, the 3-keto group, blocked in the form of the enamine, does not react and is subsequently liberated during the ensuing hydrolysis.

It is likewise possible to conduct simultaneous chemical reactions with the thus-obtained enamine. For example a 16α,17α-epoxy-16β-methyl-19-norenamine of the progesterone series can be treated with an aqueous acid so that the epoxide and enamine groups are both split, with the desired 3-keto-$\Delta^4$ system being obtained from the latter group.

DETAILED DISCUSSION OF THE INVENTION

It is of particular advantage that the commercially interesting steroids of the 19-nor-androstane and the 19-nor-pregnane series can be produced in accordance with the invention. In general, however, any steroid can be employed as a starting material for the process of this invention if it contains a 3-keto-$\Delta^4$-19-hydroxy group in the molecule. Thus, the term "steroids" is meant to cover also in this context, nor-, homo- and cyclo-steroids. The starting compounds can be substituted by any moiety which does not interfere with the formation of the 19-nor-3,5-diene-3-amine, including but not limited to substituents conventional to the sterol series, such as halogen atoms, OH, O-acyl, O-alkyl, alkyl, alkenyl, alkynyl groups of preferably respectively up to 4 carbon atoms, epoxy, nitro, S-acyl, cycloalkyl, or aryl groups.

Preferred starting compounds are, for example, those of the general Formulae II, IIa and IIb:

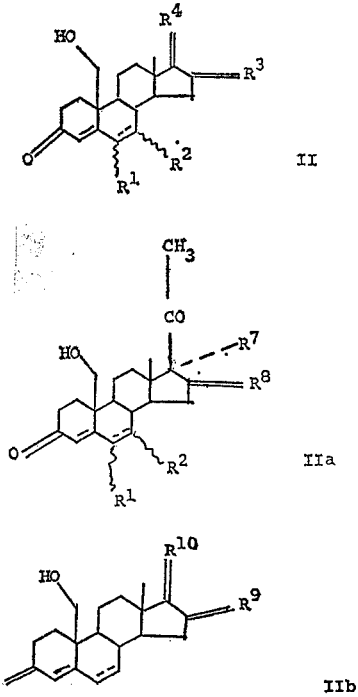

wherein:

$R_1$ represents H, F, Cl, Br or $CH_3$,
$R_2$ represents H or $CH_3$
$R_3$ represents $H_2$, $(H,CH_3)$, $CH_2$, $(H,OH)$ or O,
$R_4$ represents $H_2$, O, $\alpha R_5\beta OR_6$ or $\alpha R_7\beta COCH_3$,
$R_5$ represent H, alkyl or 1–8 carbon atoms, alkenyl or alkynyl of respectively up to 4 carbon atoms, $R_6$ represents H or acyl (preferably alkanoyl) of up to 7 carbon atoms (preferably acetyl), and $R_7$ represents H or $OR_6$; and wherein $R_3$ and $R_7$ together also represent a 16α, 17α-acetonide group and a 16β-H-atom, and $R_8$ represents $H_2$, $(H,CH_3)$, $CH_2$ or $(H,OH)$;

$R_9$ represents $H_2$ or O, and $R_{10}$ represents $H_2$, O or $\alpha R_5 \beta OR_6$, and the dashed line in the 6(7)-position indicates the optional presence of an additional double bond.

Specific embodiments of the starting materials include but are not limited to: 19-hydroxy-4-androstene-3,16-dione, 19-hydroxy - 4 - androstene - 3,17- dione, 17β,19-dihydroxy - 4 - androstene - 3 - one, 19 - hydroxytestosterone, 17α-ethynyl - 19 - hydroxytestosterone, 19 - hydroxyprogesterone, 17α,19-dihydroxyprogesterone and the 17-acylates thereof, 16 - methylene - 17α,19 - dihydroxyprogesterone and the 17-acylates and 17-ethers thereof, 6- and 7-methyl-19-hydroxyprogesterones, 6- and 7-methyl-17α,19 - dihydroxyprogesterones and the 17-acylates thereof, 6 - halogeno-6-dehydro-19-hydroxyprogesterones, 6-halogeno-6-dehydro-17α,19-dihydroxyprogesterones and the 17-acylates thereof.

The starting substances are either known, or they can be readily produced by methods known from the literature in connection with the preparation of 19-hydroxysteroids, for example such as described in Journal of the American Chemical Society, 84, 3204 [1962] or in Experientia 18, 464 [1962].

The conversion of the 19-hydroxysteroids to the 19-norenamines is conducted by treatment with secondary amines, preferably pyrrolidine, piperidine or morpholine. However, other secondary amines suitable for the production of enamines can likewise be employed, such as, for example, ethylenimine, trimethylenimine, hexamethylenimine, dimethylamine, diethylamine, methylaniline, and N-methyl-N-cyclohexylamine.

The type of the secondary amine is not critical provided it does not contain other functional groups which might interfere with the keto groups or any other substituents of the steroid molecule. In general, secondary amines of the formula X—NH—Y wherein X represents an alkyl group of up to 6 carbon atoms, Y represents a hydrocarbon alkyl, cycloalkyl or aryl group of up to 10 carbon atoms or X or Y together represent a —$(CH_2)_n$— (wherein $n$ is an integer of 2 to 6) or —$CH_2CH_2OCH_2CH_2$— chain, appear most suitable.

An excess of the amine can be employed as the solvent; however, the reaction progresses more advantageously in the presence of an inert solvent. Suitable are conventional inert solvents such as alcohols of preferably 1-4 carbon atoms, e.g., methanol, ethanol or isopropanol; hydrocarbons, e.g., hexane, heptane, petroleum ether, benzene, toluene or xylene; chlorinated hydrocarbons, e.g. methylene chloride; ethers, e.g. diethyl ether, diisopropyl ether, tetrahydrofuran, diglyme or dioxane.

The reaction takes place at temperatures of between 0° C. and the boiling point of the solvent employed, preferably between 60 and 100° C. Depending on the specific starting compound and conditions employed, the reaction is terminated after reaction times of between about 1 minute and 8 hours. For example, at higher temperatures, the reaction times are shorter. On the other hand, the use of open chain aliphatic amines, such as diethylamine, requires longer reaction times than that of pyrrolidine. Even with a 1 minute reaction time, all starting compounds will yield a finite amount of the desired final products, and even longer reaction times than 8 hours will not adversely affect the reaction. It is advantageous to add an acidic catalyst, such as p-toluenesulfonic acid, or an acidic cation exchange resin. However, it is also possible to employ basic catalysts, such as calcium oxide, sodium hydroxide, potassium hydroxide or carbonate. When using solvents suitable for this purpose (for example benzene), it is advantageous to remove the condensed-out water azeotropically.

When, in addition to the keto group in the 3-position, further oxo groups are present in the starting compound, they can likewise react with the secondary amine resulting in intermediates containing several enamine groupings. However, this does not interfere with the process of this invention, since, during the subsequent hydrolysis, all enamine groups are again cleaved. Furthermore, it is usually possible to operate under conditions wherein only the keto group in the 3-position is converted into the enamine, with the remaining oxo groups being unchanged. This is so because the 3-keto group can generally be converted into the enamine more readily than, for example, keto groups in the 11-, 16-, 17- or 20-position. To illustrate, when reacting a 3,17-diketone with only one equivalent of pyrrolidine, the 17-oxo-3-enamine is obtained.

The resultant 19-norenamines can be subjected to further chemical reactions, if desired. Since they contain the 3-keto group in the blocked form, it is of advantage to use reactions wherein a free 3-keto group would interfere, but wherein the enamine group is not attacked.

For example, additional keto groups in the molecule, preferably in the 16- or 17-position, but as well in the 11- or 20-position, can be reduced to CHOH or $CH_2$ groups, or can be reacted to the corresponding carbinol groups with organometallic reagents, preferably those of the general formula $$R—M$$

wherein:

R represents an alkyl group of 1–8 carbon atoms or an alkenyl or alkynyl group of up to 4 carbon atoms, respectively, M is Na, K, Li or MgX, and X represents Cl, Br or I.

The keto groups are preferably reduced with a complex metal hydride, for example, with lithium aluminum hydride, lithium aluminum tri-tert.-butoxyhydride, potassium borohydride, sodium trimethoxy borohydride or lithium borohydride. If this reaction is conducted in an anhydrous medium, the enamine group is not attacked. The preferred solvent is an ether, such as diethyl ether, diisopropyl ether, tetrahydrofuran, dioxane or diglyme; when using borohydrides, alcohols can likewise be used, such as methanol, ethanol or isopropanol. Normally, the reduction is carried out at temperatures of between 0° C. and the boiling point of the solvent employed. The reaction is terminated after reaction times ranging between a few minutes and several days.

When reacting the ketones with organomethallic compounds, the process is conducted in ethers, such as those mentioned above, and optionally also in benzene, toluene or in mixtures of the above-mentioned solvents. It is also possible to operate in a solvent mixture, for example in ether-benzene, from which the more volatile component is removed during the reaction by distillation. Advantageously, the process is conducted at room temperature until the reaction commences, in some cases with cooling, and subsequently the reaction is terminated by heating or boiling. Conducting the reaction under an inert gas, such as nitrogen, is favorable, especially during the reaction with organoalkalimetal compounds. Suitable organometallic compounds include but are not limited to: methyllithium, methylmagnesium chloride, bromide or iodide, ethyllithium, ethylmagnesium chloride, bromide or iodide, vinyllithium, vinylmagnesium bromide, ethynyllithium, and ethynylmagnesium bromide.

The subsequent work-up operation is conducted by decomposing the reaction mixture with acids, for example hydrochloric acid, salt solution, such as ammonium chloride solution, or water. During this procedure, the first-formed organometallic complex and the enamine system are both hydrolyzed, normally, at the same time.

To synthesize the important 17α-ethynyl-17β-hydroxy-steroids of the norethisterone type, the 17-keto-19-norenamine is dissolved preferably in a solution of potassium tert.-butylate in tert.-butanol, and acetylene is then introduced into this solution under an inert blanket such as a nitrogen atmosphere.

To synthesize the 17-esters and 17-ethers of 16-methylene-17α-hydroxy-19-norprogesterone, important as progestational agents, a 16α,17α-epoxy-16β-methyl - 3,5 - pregnadiene-3-amine-20-one can be reacted with an acid of the Bronsted or Lewis type (or with a carboxylic acid anhydride, such as acetic anhydride), thus obtaining the 16-methylene-17α-hydroxy (or -17α-acyloxy) -19-norprogesterone grouping. Thereafter, such a compound can be etherified or esterified in a conventional manner, as described in the literature.

It is also possible to introduce alkyl or acyl groups into the thus-obtained 19-norenamine, using alkylation or acylation methods disclosed in the literature. For example, by reaction with alkyl halogenides (e.g. methyl iodide) in boiling dioxane, alkyl groups (for example a methyl group) can be introduced in the 4-position; and by analogous reaction with ethyl acrylate or acrylonitrile, a 2-carbethoxyethyl or a 2-cyanoethyl group can be introduced in the 4-position. The introduction of an acyl group (e.g. acetyl or propionyl group) in the 4- or 6-position is accomplished by reaction with an acyl halogenide, such as acetyl chloride or propionyl chloride.

The resultant 19-norenamines can be subsequently hydrolyzed in a conventional manner, thus producing the desired 19-nor-3-keto-Δ⁴-steroids. For this purpose, the enamines, prior to hydrolysis can be isolated and purified in accordance with known methods, preferably by crystallization and/or chromatography. However, it is also possible to hydrolyze the crude enamines directly, without any further purification, if desired, after the solvent and the excess secondary amine have been removed.

The hydrolysis is conducted preferably in an acidic medium, for example by means of a buffer mixture made up of water, acetic acid, sodium acetate and a lower alcohol, such as methanol or ethanol. The hydrolysis can also be conducted with other acids, e.g. aqueous mineral acids, such as hydrochloric acid or sulfuric acid, sulfonic acids, such as benzenesulfonic acid or p-toluenesulfonic acid, or carboxylic acids, such as oxalic acid or propionic acid, the preferred pH in case being about 0 to 7.

It is also possible to split the enamine by heating with an aqueous lower alcohol, such as ethanol, or by heating with water or dilute alkali.

By operating according to this invention, it is advantageous, in particular, to produce compounds of the general Formulae I, Ia and Ib:

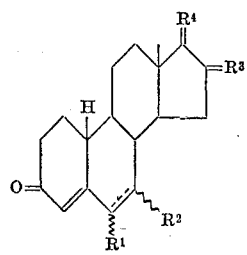

I

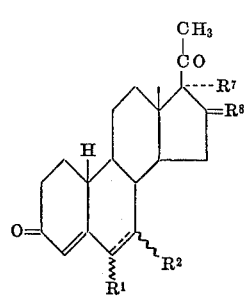

Ia

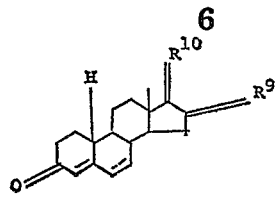

Ib wherein the various R groups are defined as previously indicated.

The active compounds obtainable according to this invention can be employed in pharmaceutical compositions in admixture with solid and/or liquid excipient, optionally in combination with other active agents, for example other steroids, particularly estrogens. Carrier substances are those organic or inorganic materials which are suitable for parenteral, enteral or topical application and do not react with the compounds, such as, for example, water, vegetable oils, polyethylene glycols, gelatin, lactose, amylose, magnesium stearate, talc, Vaseline, cholesterol. For parenteral application, sutiable are, in particular, solutions, preferably oily or aqueous solutions, as well as suspensions or emulsions. For enteral application suitable are, furthermore, tablets, pills or dragées, for topical application salves, creams or powders. The above-named preparations can optionally be sterilized or mixed with auxiliary agents, such as preservatives, stabilizers or wetting agents, salts for influencing the osmotic pressure, buffers, coloring agents, flavoring agents and/or aromatic substances.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all degrees are set forth in degrees centigrade.

EXAMPLE 1

(a) 0.3 g. of 19-hydroxy-4-androstene-3,16-dione (M.P. 202–203°; obtainable from 3β-acetoxy-5-androstene-16-one by way of 3β-acetoxy-5α-chloro-6β-hydroxyandrostane - 16 - one (M.P. 192–194°), 3β-acetoxy-5α-chloro-6β,19 - epoxyandrostane-16 one (M.P. 186–187°), 5α-chloro - 6β,19 - epoxyandrostane-3,16-dione (M.P. 209–211°) and 6β,19 - epoxy-4-androstene-3,16-dione (M.P. 209–211°) analogously to the method described in Helv. Chim. Acta 46, 344 [1963]) is dissolved in 5 ml. of methanol and heated to the boiling point with 0.3 ml. of pyrrolidine. Within one minute, the 3-pyrrolidino-19-nor-10β - 3,5 - androstadiene-16-one separates in crystalline form. The reaction product is vacuum-filtered and washed with ice-cold methanol; M.P. 214–216° (decomposition).

In place of pyrrolidine, it is also possible to employ piperidine or morpholine, thus obtaining 3-piperidino- or 3 - morpholino - 19-nor-3,5-androstadiene-16-one, respectively.

(b) 0.12 g. of 3-pyrrolidino-19-nor-10β-3,5-androstadiene-16-one is boiled for 4 hours under a nitrogen atmosphere with 20 ml. of a 40% sodium acetate solution, 8 ml. of acetic acid, and 60 ml. of methanol. The reaction mixture is acidified with hydrochloric acid, extracted with methylene chloride, the extracts are washed, dried, evaporated, and 19 - nor-10βH-4-androstene-3,16-dione is obtained, M.P. 137–138° (methanol/water).

Analogously, the following compounds are obtainable by way of the corresponding 3-pyrrolidino-, 3-piperidino- or 3-morpholino-19-nor-Δ³,⁵-steroids:

from 19-hydroxy-4-androstene-3,17-dione: 19-nor-10βH-4-androstene-3,17-dione, M.P. 170–171°;

from 17α,19-dihydroxy-4-androstene-3-one: 17α-hydroxy-19-nor-10βH-4-androstene-3-one;

from 19 - hydroxytestosterone: 19-nortestosterone, M.P. 111–112°;

from 17α-ethynyl-19-hydroxytestosterone: 17α-ethynyl-19-nortestosterone, M.P. 205–207°;

from 7α-methyl-17α-ethynyl-19-hydroxytestosterone: 7α-methyl-17α-ethynyl-19-nortestosterone;

from 17α-methyl-19-hydroxytestosterone: 17α-methyl-19-nortestosterone, M.P. 157–158°;

from 17α-ethyl-19-hydroxytestosterone: 17α-ethyl-19-nortestosterone, M.P. 136–138°;

from 19-hydroxy-4,6-androstadiene-3,17-dione: 19-nor-10βH-4,6-androstadiene-3,17-dione, M.P. 181–182°;

from 19-hydroxyprogesterone: 19-norprogesterone, M.P. 144–145°;

from 19-hydroxy-4-pregnene-3,11,20-trione: 19-nor-10βH-4-pregnene-3,11,20-trione, M.P. 175–176°;

from 17α-acetoxy-19-hydroxy-4,6-pregnadiene-3,20-dione: 17α-acetoxy-19-nor-10βH-4,6-pregnadiene-3,20-dione, M.P. 237–239°;

from 17α,19-dihydroxyprogesterone: 17α-hydroxy-19-norprogesterone;

from 17α-acetoxy-19-hydroxyprogesterone: 17α-acetoxy-19-norprogesterone;

from 16-methylene-17α,19-dihydroxyprogesterone: 16-methylene-17α-hydroxy-19-norprogesterone, M.P. 234–236°;

from 16-methylene-17α-acetoxy-19-hydroxyprogesterone: 16-methyl-17α-acetoxy-19-norprogesterone, M.P. 178–180°;

from 16-methylene-17α-ethoxy-19-hydroxyprogesterone: 16-methylene-17α-ethoxy-19-norprogesterone, M.P. 146–147°;

from 6α-methyl-19-hydroxyprogesterone: 6α-methyl-19-norprogesterone;

from 7α-methyl-19-hydroxyprogesterone: 7α-methyl-19-norprogesterone;

from 6α-methyl-17α-acetoxy-19-hydroxyprogesterone: 6α-methyl-17α-acetoxy-19-norprogesterone;

from 6-methyl-6-dehydro-17α-acetoxy-19-hydroxyprogesterone: 6-methyl-6-dehydro-17α-acetoxy-19-norprogesterone;

from 6-chloro-6-dehydro-17α-acetoxy-19-hydroxyprogesterone: 6-chloro-6-dehydro-17α-acetoxy-19-norprogesterone;

from 19-hydroxy-4-cholestene-3-one: 19-nor-10βH-4-cholestene-3-one.

EXAMPLE 2

(a) Analogously to Example 1, 19-hydroxy-4-androstene-3,17-dione is reacted to form 3-pyrrolidino-19-nor-10β-3,5-androstadiene-17-one, which is further processed in the crude condition.

(b) 0.33 g. of 3-pyrrolidino-19-nor-10β-3,5-androstadiene-17-one is dissolved in 10 ml. of absolute tetrahydrofuran, mixed with an ether solution of 20 mg. of lithium aluminum hydride, agitated for one hour at room temperature, and then decomposed by first adding, dropwise, water and thereafter dilute hydrochloric acid. The reaction mixture is boiled for 15 minutes, extracted with methylene chloride, and the extracts are washed, dried, and evaporated, thus obtaining 19-nortestosterone, M.P. 111–112°.

(c) A suspension of 1.07 g. of magnesium filings in 40 ml. of absolute ether is mixed under agitation, within 15 minutes, with a solution of 5.3 g. of methyl iodide in 36 ml. of absolute ether, and the reaction mixture is boiled for one hour. Then, the mixture is mixed with a solution of 3.25 g. of 3-pyrrolidino-19-nor-10β-3,5-androstadiene-17-one in 100 ml. of absolute tetrahydrofuran, and boiled for another two hours. Then, the reaction solution is allowed to cool, poured in 500 ml. of 2% aqueous NH$_4$Cl solution, allowed to stand overnight, extracted with methylene chloride. The extracts are washed, dried and evaporated, thus obtaining 17α-methyl-19-nor-testosterone, M.P. 157–158°.

Analogously, the following compounds are obtained by reaction with ethylmagnesium iodide, propylmagnesium bromide, n-butylmagnesium bromide, n-octylmagnesium bromide and allylmagnesium chloride, respectively:

17α-ethyl-19-nortestosterone, M.P. 136–138°;
17α-propyl-19-nortestosterone, M.P. 122–123°;
17α-n-butyl-19-nortestosterone, M.P. 126–127°;
17α-n-octyl-19-nortestosterone, M.P. 120–122°;
17α-allyl-19-nortestosterone, M.P. 93–95°.

(d) 3.25 g. of 3-pyrrolidino-19-nor-10β-3,5-androstadiene-17-one is dissolved in 100 ml. of absolute toluene and mixed with a solution of 4 g. of potassium in 100 ml. of absolute tert.-amyl alcohol under a nitrogen atmosphere. Dry acetylene is introduced into the reaction solution for 18 hours; then, water and hydrochloric acid are added until a pH of 1 is attained; the organic solvents are removed by steam distillation, and the reaction mixture is filtered. Recrystallization from ethyl acetate yields 17α-ethynyl-19-nor-testosterone, M.P. 202–204°.

(e) 3.25 g. of 3-pyrrolidino-19-nor-10β-3,5-androstadiene-17-one is dissolved in 25 ml. of dry chloroform under a nitrogen atmosphere. Then, 2.2 ml. of absolute triethylamine is added and thereafter, within 30 minutes, a solution of 1 ml. of acetyl chloride in 5 ml. of dry chloroform is added dropwise at room temperature. Subsequently, the reaction mixture is agitated for 12 hours at room temperature, evaporated under reduced pressure, and the residue is hydrolyzed as described in Example 1(b). After chromatography on aluminum oxide with ether/ethyl acetate, there is obtained 6β-acetyl-19-nor-10β-4-androstene-3,17-dione.

EXAMPLE 3

(a) Analogously to Example 1, 16α,17α-epoxy-16β-methyl-19-hydroxyprogesterone is converted, with pyrrolidine, into 3-pyrrolidino-16α,17α-epoxy-16β-methyl-19-nor-3,5-pregnadiene-20-one. The starting compound, 16α,17α-epoxy-16β-methyl-19-hydroxyprogesterone, is obtainable from 3β-acetoxy-16α,17α-epoxy-16β-methyl-5-pregnene-20-one by HOBr addition, irradiation of the bromohydrin in cyclohexane with lead tetraacetate with the formation of 3β-acetoxy-5α-bromo-6β,19;16α,17α-diepoxy-16β-methyl-pregnane-20-one, splitting off HBr with pyridine, alkaline saponification and oxidation with CrO$_3$/pyridine to 6β,19;16α,17α-diepoxy-16β-methylprogesterone and reductive splitting of the 6β,19-oxide ring with zinc dust in ethanol.

(b) 0.38 g. of 3-pyrrolidino-16α,17α-epoxy-16β-methyl-19-nor-3,5-pregnadiene-20-one is boiled for 2 hours in a mixture of 20 ml. of benzene, 20 ml. of acetic anhydride and 10 mg. of p-toluene-sulfonic acid. The reaction solution is then evaporated. The residue consisting mostly of 3-pyrrolidino-16-methylene-17α-acetoxy-19-nor-3,5-pregnadiene-20-one is mixed with 30 ml. of 40% sodium acetate solution, 12 ml. of acetic acid and 90 ml. of methanol, boiled for 4 hours under a nitrogen atmosphere, and worked up as in Example 1(b), thus obtaining 16-methylene-17α-acetoxy-19-norprogesterone, M.P. 178–180° (CH$_3$OH).

(c) 0.38 g. of 3-pyrrolidino-16α,17α-epoxy-16β-methyl-19-nor-3,5-pregnadiene-20-one is allowed to stand in 20 ml. of dimethyl formamide with 1 ml. of 30% aqueous hydrochloric acid for 24 hours at room temperature. The reaction mixture is poured into water, filtered off, the precipitate washed with water, dried, and separated by layer chromatography on silanized silica gel with methanol/water (6:4). First, 16-methylene-17α-hydroxy-19-norprogesterone is obtained, M.P. 234–236° (from acetone), and then 15-dehydro-16-methyl-17α-hydroxy-19-norprogesterone is recovered.

EXAMPLE 4

(a) 0.3 g. of 16-methylene-17α-acetoxy-19-hydroxyprogesterone [M.P. 230–232°; obtainable from 3β,17α-diacetoxy-16-methylene-5-pregnene-20-one (M.P. 145–146°) by way of 3β,17α-diacetoxy-5α-chloro-6β-hydroxy-16-methylene-pregnane-20-one (M.P. 212–214°), 3β,17α-diacetoxy-5α-chloro-6β,19-epoxy-16-methylene-pregnane-20-one (M.P. 220–222°), 3β-hydroxy-5α-chloro- 6β,19-epoxy - 16 - methylene - 17α - acetoxy-pregnane-20-one, 5α-chloro-6β,19-epoxy - 16 - methylene-17α-acetoxy-pregnane-3,20-dione and 6β,19-epoxy-16-methylene-17α-acetoxy-progesterone (M.P. 260–261°)] is dissolved in 5 ml. of ethanol, 0.3 ml. of diethylamine is added, the mixture is boiled for 1 hour, cooled and worked up as described in Example 1 whereupon 3-diethylamino-16-methylene-17α-acetoxy-19-nor-10β - 3,5 - pregnadiene-20-one is obtained.

Similarly, using dimethylamine, di-n-propylamine, diisobutylamine, di - n - hexylamine, N-methyl-N-n-decylamine, N-methyl-N-cyclopropylamine, N-methyl-N-cyclodecylamine, N-ethyl-aniline, N-methyl-N-(1-naphthyl)-amine, ethylenimine, trimethylenimine, pyrrolidine, piperidine, hexamethylenimine or morpholine, respectively, the following enamines are obtained:

3-dimethylamino-16-methylene-17α-acetoxy-19-nor-10β-3,5-pregnadiene-20-one
3-di-n-propylamino-16-methylene-17α-acetoxy-19-nor-10β-3,5-pregnadiene-20-one
3-diisobutylamino-16-methylene-17α-acetoxy-19-nor-10β-3,5-pregnadiene-20-one
3-di-n-hexylamino-16-methylene-17α-acetoxy-19-nor-10β-3,5-pregnadiene-20-one
3-(N-methyl-N-n-decylamino)-16-methylene-17α-acetoxy-19-nor-10β-3,5-pregnadiene-20-one
3-(N-methyl-N-cyclopropylamino)-16-methylene-17α-acetoxy-19-nor-10β-3,5-pregnadiene-20-one
3-(N-methyl-N-cyclodecylamino)-16-methylene-17α-acetoxy-19-nor-10β-3,5-pregnadiene-20-one
3-(N-ethyl-anilino-16-methylene-17α-acetoxy-19-nor-10β-3,5-pregnadiene-20-one
3-(N-methyl-N-1-naphthylamino)-16-methylene-17α-acetoxy-19-nor-10β-3,5-pregnadiene-20-one
3-ethylenimino-16-methylene-17α-acetoxy-19-nor-10β-3,5-pregnadiene-20-one
3-trimethylenimino-16-methylene-17α-acetoxy-19-nor-10β-3,5-pregnadiene-20-one
3-pyrrolidino-16-methylene-17α-acetoxy-19-nor-10β-3,5-pregnadiene-20-one
3-piperidino-16-methylene-17α-acetoxy-19-nor-10β-3,5-pregnadiene-20-one
3-hexamethylenimino-16-methylene-17α-acetoxy-19-nor-10β-3,5-pregnadiene-20-one
3-morpholino-16-methylene-17α-acetoxy-19-nor-10β-3,5-pregnadiene-20-one (b) The enamines obtained according to Example 4(a) are hydrolyzed similarly to the procedure as described in Example 1(b) to yield 16-methylene-17α-acetoxy-19-nor-progesterone, M.P. 178–180°.

EXAMPLE 5

(a) Analogously to Example 1(a), 16-methylene-17α, 19-dihydroxy-progesterone and its 17-formiate, 17-propionate, 17-butyrate, 17-valerate, 17-capronate and 17-enanthate are reacted with pyrrolidine, piperidine or morpholine to form the following compounds:

3-pyrrolidino-16-methylene-17α-hydroxy-19-nor-10β-3,5-pregnadiene-20-one
3-piperidino-16-methylene-17α-hydroxy-19-nor-10β-3,5-pregnadiene-20-one
3-morpholino-16-methylene-17α-hydroxy-19-nor-10β-3,5-pregnadiene-20-one
3-pyrrolidino-16-methylene-17α-formyloxy-19-nor-10β-3,5-pregnadiene-20-one
3-piperidino-16-methylene-17α-formyloxy-19-nor-10β-3,5-pregnadiene-20-one
3-morpholino-16-methylene-17α-formyloxy-19-nor-10β-3,5-pregnadiene-20-one
3-pyrrolidino-16-methylene-17α-propionyloxy-19-nor-10β-3,5-pregnadiene-20-one
3-piperidino-16-methylene-17α-propionyloxy-19-nor-10β-3,5-pregnadiene-20-one
3-morpholino-16-methylene-17α-propionyloxy-19-nor-10β-3,5-pregnadiene-20-one
3-pyrrolidino-16-methylene-17α-butyryloxy-19-nor-10β-3,5-pregnadiene-20-one
3-piperidino-16-methylene-17α-butyryloxy-19-nor-10β-3,5-pregnadiene-20-one
3-morpholino-16-methylene-17α-butyryloxy-19-nor-10β-3,5-pregnadiene-20-one
3-pyrrolidino-16-methylene-17α-valeryloxy-19-nor-10β-3,5-pregnadiene-20-one
3-piperidino-16-methylene-17α-valeryloxy-19-nor-10β-3,5-pregnadiene-20-one
3-morpholino-16-methylene-17α-valeryloxy-19-nor-10β-3,5-pregnadiene-20-one
3-pyrrolidino-16-methylene-17α-capronyloxy-19-nor-10β-3,5-pregnadiene-20-one
3-piperidino-16-methylene-17α-capronyloxy-19-nor-10β-3,5-pregnadiene-20-one
3-morpholino-16-methylene-17α-capronyloxy-19-nor-10β-3,5-pregnadiene-20-one
3-pyrrolidino-16-methylene-17α-enanthoyloxy-19-nor-10β-3,5-pregnadiene-20-one
3-piperidino-16-methylene-17α-enanthoyloxy-19-nor-10β-3,5-pregnadiene-20-one
3-morpholino-16-methylene-17α-enanthoyloxy19-nor-10β-3,5-pregnadiene-20-one (b) Analogously to Example 1(b), there are obtained by hydrolyzing the enamines mentioned in Example 5(a):

16-methylene-17α-hydroxy-19-nor-progesterone
16-methylene-17α-formyloxy-19-nor-progesterone
16-methylene-17α-propionyloxy-19-nor-progesterone
16-methylene-17α-butyryloxy-19-nor-progesterone
16-methylene-17α-valeryloxy-19-nor-progesterone
16-methylene-17α-capronyloxy-19-nor-progesterone
16-methylene-17α-enanthoyloxy-19-nor-progesterone The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In the process for the production of a 19-nor-steroid from a 19-hydroxy-3-keto-$\Delta^4$-steroid the step comprising reacting said 19-hydroxy-3-keto-$\Delta^4$-steroid with a secondary amine selected from the group consisting of pyrrolidine, piperidine and morpholine to form the corresponding 19-nor-3,5-diene-3-amine.

2. In a process as defined by claim 1 the further step comprising hydrolyzing said 19-nor-3,5-diene-3-amine to form the corresponding 19-nor-3-keto-$\Delta^4$-steriod.

3. In a process for the production of 16-methylene-17α-hydroxy-19-nor-progesterone and its 17-alkanoates wherein the alkanoyl radical is of up to 7 carbon atoms the steps comprising reacting 16-methylene-17α, 19-dihydroxy-progesterone or its 17-alkanoate with a secondary amine selected from the group consisting of pyrrolidine, piperidine and morpholine to form the corresponding 19-nor-3,5-diene-3-amine and subsequently hydrolyzing said 19-nor-3,5-diene-3-amine to form 16-methylene - 17α-hydroxy-19-nor-progesterone and its 17-alkanoates wherein the alkanoyl radical is of up to 7 carbon atoms.

4. A process comprising reacting a 19-hydroxy-3-keto-$\Delta^4$-steroid with a secondary amine to form the corresponding 19-nor-3,5-diene-3-amine.

5. A process as defined by claim 4 further comprising the step of hydrolyzing said 19-nor-3,5-diene-3-amine to form the corresponding 19-nor-3-keto-$\Delta^4$-steroid.

6. A process as defined by claim 4, said 19-nor-3,5-diene-3-amine containing at least one additional keto group in the 16, 17, 11 or 20 positions and being further reacted to reduce said at least one additional keto group to methylene or carbinol groups.

7. A process as defined by claim 6 wherein said 19-nor-3,5-diene-3-amine is reduced with an organometallic reagent of the formula

R—M wherein R represents alkyl of 1–8 carbon atoms, alkenyl of up to 4 carbon atoms or alkynyl group of up to 4 carbon atoms, M represents Na, K, Li or MgX, and X represents Cl, Br or I, to form a carbinol group from said at least one keto group.

8. A process as defined by claim 6 further comprising the step of hydrolyzing resultant reduced 19-nor-3,5-diene-3-amine to form the corresponding 19-nor-3-keto-$\Delta^4$-steroid.

9. A process as defined by claim 7 further comprising the step of hydrolyzing resultant reduced 19-nor-3,5-diene-3-amine to form the corresponding 19-nor-3-keto-$\Delta^4$-steroid.

10. A process as defined by claim 4 wherein said secondary amine is of the formula

X—NH—Y wherein X represents alkyl of up to 6 carbon atoms; Y represents alkyl of up to 10 carbon atoms, cycloalkyl of up to 10 carbon atoms or hydrocarbon aryl of up to 10 carbon atoms; or X and Y together represent —(CH$_2$)$_n$— or —CH$_2$CH$_2$OCH$_2$CH$_2$—, $n$ being an integer of 2–6.

11. A process as defined by claim 4 wherein resultant 19-nor-3,5-diene-3-amine is a 17 - keto-19-norenamine, and further comprising the step of passing acetylene into a potassium tert-alcoholate solution of said 17-keto-19-norenamine to form the corresponding 17α-ethynyl-17β-hydroxysteroid.

12. A process as defined by claim 11 wherein said secondary amine is of the formula

X—NH—Y wherein X represents alkyl of up to 6 carbon atoms; Y represents alkyl of up to 10 carbon atoms, cycloalkyl of up to 10 carbon atoms or hydrocarbon aryl of up to 10 carbon atoms; or X and Y together represent —(CH$_2$)$_n$— or —CH$_2$CH$_2$OCH$_2$CH$_2$—, $n$ being an integer of 2–6.

13. A process as defined by claim 4 wherein resultant 19-nor-3,5-diene-3-amine contains a 16α,17α-epoxy-16β-methyl-17β-acetyl grouping, and comprising the further step of treating same with an acid to form a 16-methylene-17α-hydroxy- or -17α-acyloxy-19-norprogesterone.

14. A process as defined by claim 13 wherein said secondary amine is of the formula

X—NH—Y wherein X represents alkyl of up to 6 carbon atoms; Y represents alkyl of up to 10 carbon atoms, cycloalkyl of up to 10 carbon atoms or hydrocarbon aryl of up to 10 carbon atoms; or X and Y together represent —(CH$_2$)$_n$— or —CH$_2$CH$_2$OCH$_2$CH$_2$—, $n$ being an integer of 2–6.

References Cited
UNITED STATES PATENTS

| | | |
|---|---|---|
| 3,150,127 | 9/1964 | Nomine et al. ____ 260—239.55 |
| 3,515,719 | 6/1970 | Campbell et al. ___ 260—239.55 |

LEWIS GOTTS, Primary Examiner

E. G. LOVE, Assistant Examiner

U.S. Cl. X.R.

260—239.55 R, 397.2, 397.3, 397.4, 999